United States Patent
Ooi et al.

(10) Patent No.: US 9,411,112 B2
(45) Date of Patent: Aug. 9, 2016

(54) PHOTOELECTRIC HYBRID BOARD, INFORMATION PROCESSOR, AND METHOD FOR MANUFACTURING PHOTOELECTRIC HYBRID BOARD

(71) Applicant: FUJITSU LIMITED, Kawasaki-shi, Kanagawa (JP)

(72) Inventors: Takahiro Ooi, Kawasaki (JP);
Michihiro Takamatsu, Zama (JP);
Yoshinori Mesaki, Yokohama (JP);
Mitsuo Suehiro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/791,807

(22) Filed: Jul. 6, 2015

(65) Prior Publication Data
US 2016/0033727 A1    Feb. 4, 2016

(30) Foreign Application Priority Data

Jul. 31, 2014  (JP) ................. 2014-156285

(51) Int. Cl.
| | |
|---|---|
| G02B 6/12 | (2006.01) |
| H05K 3/00 | (2006.01) |
| G02B 6/42 | (2006.01) |
| G02B 6/125 | (2006.01) |

(52) U.S. Cl.
CPC ............ *G02B 6/428* (2013.01); *G02B 6/12002* (2013.01); *G02B 6/12004* (2013.01); *G02B 6/125* (2013.01); *G02B 6/4214* (2013.01); *G02B 6/4246* (2013.01); *G02B 6/4257* (2013.01); *G02B 2006/12104* (2013.01); *G02B 2006/12147* (2013.01)

(58) Field of Classification Search
CPC ............... G02B 6/428; G02B 6/12002; G02B 6/12004; G02B 6/125; G02B 6/4214; G02B 6/4246; G02B 6/4257
USPC ............................................. 385/14; 29/829
See application file for complete search history.

(56) References Cited

U.S. PATENT DOCUMENTS

2005/0213872 A1* 9/2005 Iwamori ............ G02B 6/12002
                                                                                       385/14

FOREIGN PATENT DOCUMENTS

| JP | 2007-108228 A | 4/2007 |
|---|---|---|
| JP | 2008-241956 A | 10/2008 |

* cited by examiner

*Primary Examiner* — Jerry Blevins
(74) *Attorney, Agent, or Firm* — Squire Patton Boggs (US) LLP

(57) ABSTRACT

A photoelectric hybrid board includes: a first board on which a circuit is formed; an optical waveguide layer stacked with the first board; a first optical waveguide section formed in a direction of stacking in the first board and the optical waveguide layer; and a concave part formed, from the optical waveguide layer side, in the optical waveguide layer in an intersection part of the optical waveguide layer and the first optical waveguide section.

11 Claims, 11 Drawing Sheets

PHOTOELECTRIC HYBRID BOARD, INFORMATION PROCESSOR, AND METHOD FOR MANUFACTURING PHOTOELECTRIC HYBRID BOARD

CROSS-REFERENCE TO RELATED APPLICATION

This application is based upon and claims the benefit of priority of the prior Japanese Patent Application No. 2014-156285, filed on Jul. 31, 2014, the entire contents of which are incorporated herein by reference.

FIELD

The embodiments discussed herein are related to a photoelectric hybrid board, an information processor, and a method for manufacturing a photoelectric hybrid board.

BACKGROUND

There is a photoelectric hybrid package in which an optical waveguide structure section is formed in a hole for the optical waveguide structure section of a wiring board and an optical connector having an optical path conversion section is arranged on a rear surface of the wiring board.

In addition, there is a photoelectric hybrid board in which a core layer and a second clad layer are formed on a first clad layer, and an optical path conversion mirror is formed with a predetermined position of the core layer inclined to an optical axis from the second clad layer side.

In a photoelectric hybrid board, a reflection surface is formed that reflects light between an optical waveguide layer and an optical waveguide section. When this reflection surface is formed first and then the optical waveguide layer is stacked to a printed circuit board, high-precision alignment of the reflection surface with the optical waveguide section of the printed circuit board may become difficult.

The followings are reference documents.
[Document 1] Japanese Laid-open Patent Publication No. 2008-241956 and
[Document 2] Japanese Laid-open Patent Publication No. 2007-108228.

SUMMARY

According to an aspect of the invention, a photoelectric hybrid board includes: a first board on which a circuit is formed; an optical waveguide layer stacked with the first board; a first optical waveguide section formed in a direction of stacking in the first board and the optical waveguide layer; and a concave part formed, from the optical waveguide layer side, in the optical waveguide layer in an intersection part of the optical waveguide layer and the first optical waveguide section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A first embodiment is described in detail based on the drawings.

Figure 1:
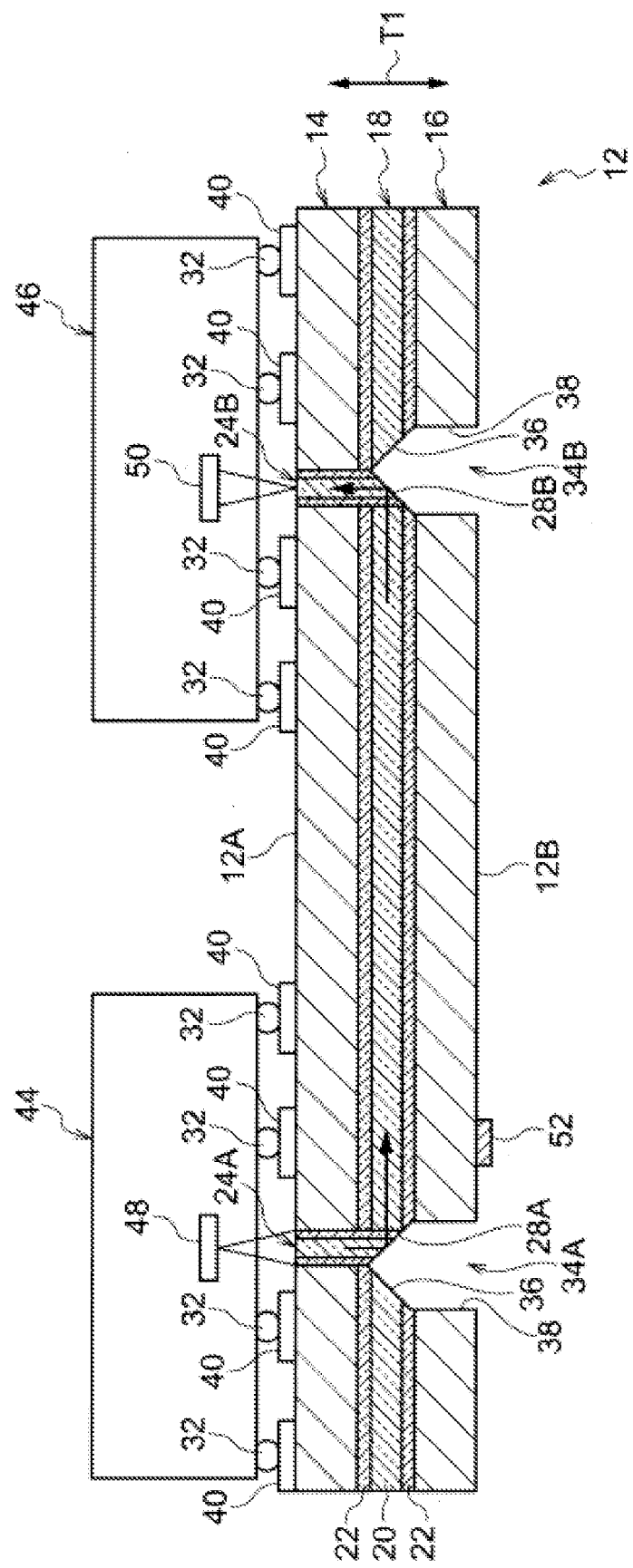
FIG. 1 is a cross-sectional view illustrating a photoelectric hybrid board of a first embodiment.

As illustrated in FIG. 1, a photoelectric hybrid board 12 of the first embodiment has a first printed circuit board 14, a second printed circuit board 16, and an optical waveguide layer 18. The optical waveguide layer 18 is located between the first printed circuit board 14 and the second printed circuit board 16. More specifically, the structure is such that the optical waveguide layer 18 is sandwiched by the first printed circuit board 14 and the second printed circuit board 16. In the following, a "thickness direction" is a thickness direction of the photoelectric hybrid board 12 and depicted by an arrow T1. This thickness direction T1 matches a thickness direction of the first printed circuit board 14, the second printed circuit board 16, and the optical waveguide layer 18.

Both the first printed circuit board 14 and the second printed circuit board 16 are shaped like a plate with a material having insulating properties and rigidity (glass epoxy, for example).

The optical waveguide layer 18 has a center core 20 in the thickness direction and clads 22 on the outer sides of the core (appearing on both sides of the thickness direction in FIG. 1). The core 20 has a higher light refractive index than the clads 22. Thus, in the optical waveguide layer 18, light in the core 20 is reflected at boundaries with the clads 22 and propagates within the core 20.

In the first embodiment, two optical waveguide sections 24A and 24B are formed in the first printed circuit board 14. In the following, when no distinction is made between the two optical waveguide sections 24A and 24B, in particular, the two optical waveguide sections 24A and 24B are described as the optical waveguide section 24.

Figure 2:
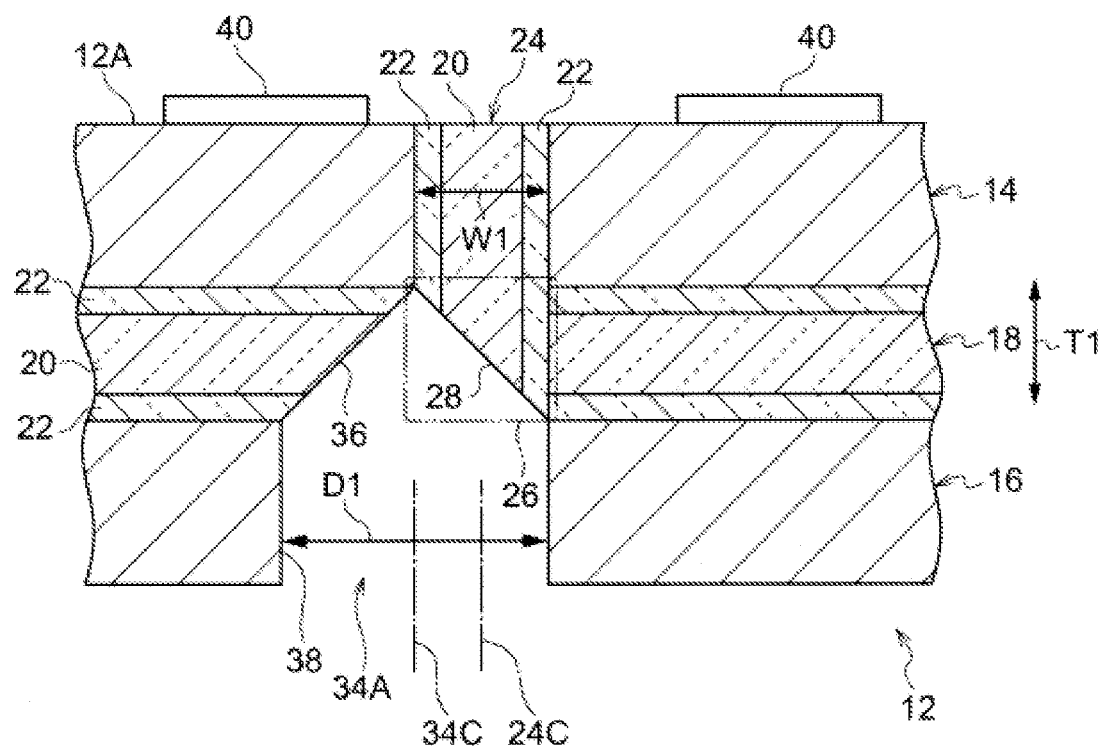
FIG. 2 is a cross-sectional view illustrating the partially enlarged photoelectric hybrid board of the first embodiment.

As illustrated in FIG. 2 in detail, the optical waveguide section 24 penetrates the first printed circuit board 14 in the thickness direction. One end of the optical waveguide section 24 is exposed on an outer surface of the first printed circuit board 14 (upper surface 12A of the photoelectric hybrid board 12 in FIG. 1 and FIG. 2), while the other end enters the optical waveguide layer 18 and intersects with the optical waveguide layer 18. A part where the optical waveguide layer 18 intersects with the optical waveguide section 24 is referred to as an intersection part 26.

Similar to the optical waveguide layer 18, the optical waveguide section 24 has the core 20 and the clads 22. Then, the core 20 has a higher light refractive index than the clads 22. Thus, in the optical waveguide section 24, light in the core 20 is reflected at the boundaries with the clads 22 and propagates within the core 20.

In this embodiment, as may be seen from FIG. 1, the optical waveguide section 24 intersects with the optical waveguide layer 18 at an angle of 90 degrees. Then, reflection surfaces 28A, 28B are formed in the intersection parts 26. Both of the reflection surfaces 28A, 28B are inclined to the optical waveguide layer 18 and the optical waveguide section 24 at an angle of 45 degrees. Then, the reflection surface 28A reflects light entering the optical waveguide section 24A to the optical waveguide layer 18. The reflection surface 28B reflects the light propagating in the optical waveguide layer 18 to the optical waveguide section 24B. In the following, when no distinction is made between the reflection surfaces 28A, 28B, the reflection surfaces 28A, 28B are described as the reflection surface 28.

In this embodiment, two concave parts 34A, 34B are formed from the outer surface side of the second printed circuit board 16 (lower surface 12B of the photoelectric hybrid board 12 in FIG. 1). In this embodiment, the two concave parts 34A, 34B respectively correspond with the optical waveguide sections 24A, 24B. In the following, when no distinction is made between the concave parts 34A, 34B, the concave parts 34A, 34B are described as the concave part 34.

Also illustrated in detail in FIG. 2, both of the concave parts 34 have a conical surface 36 on the front-end side (upper side in FIG. 1 and FIG. 2) and a cylindrical surface 38 on the back-end side (lower side in FIG. 1 and FIG. 2). The conical surface 36 is inclined to the centerline 34C of the concave part 34 at an angle of 45 degrees. The conical surface 36 is an example of an inclined surface.

A part of the conical surface 36 is located in the intersection part 26 of the optical waveguide layer 18 and the optical waveguide section 24, and the part located in this intersection part 26 is the reflection surface 28 described above. In this embodiment, in particular, the centerline 34C of the concave part 34 is laterally displaced from a centerline 24C of the optical waveguide section 24.

In contrast to this, the cylindrical surface 38 appears in parallel to the centerline 24C of the optical waveguide section 24 in the cross section depicted in FIG. 2. Then, the inside diameter D1 of the concave part 34 (part in the cylindrical surface 38) matches the inside diameter of the outermost part of the conical surface 36 and is larger than width W1 of the optical waveguide section 24.

A circuit pattern 40 is formed on the outer surface of the first printed circuit board 14 (upper surface 12A of the photoelectric hybrid board 12). A light emitting member 44 and a light receiving member 46 are mounted on this circuit pattern 40. A circuit pattern 52 is also formed on the outer surface of the second printed circuit board 16 (lower surface 12B of the photoelectric hybrid board 12).

The light emitting member 44 and the light receiving member 46 are electrically connected with the circuit pattern 40 on the upper surface 12A of the photoelectric hybrid board 12 by a conductive material such as solder 32.

The light emitting member 44 has a light emitting section 48. Then, the light emitting member 44 converts an electric signal inputted from the circuit pattern 40 into an optical signal and generates the optical signal from the light emitting section 48. The light emitting member 44 is mounted at a position where the optical signal from the light emitting section 48 enters the optical waveguide section 24, on the upper surface 12A of the photoelectric hybrid board 12.

The light receiving member 46 has a light receiving section 50. Then, the light receiving member 46 is mounted at a position where the optical signal exits from the optical waveguide section 24B, on the upper surface 12A of the photoelectric hybrid board 12. The light receiving member 46 converts the optical signal received at the light receiving section 50 into an electric signal and outputs the electric signal to the circuit pattern 40.

Figure 3:
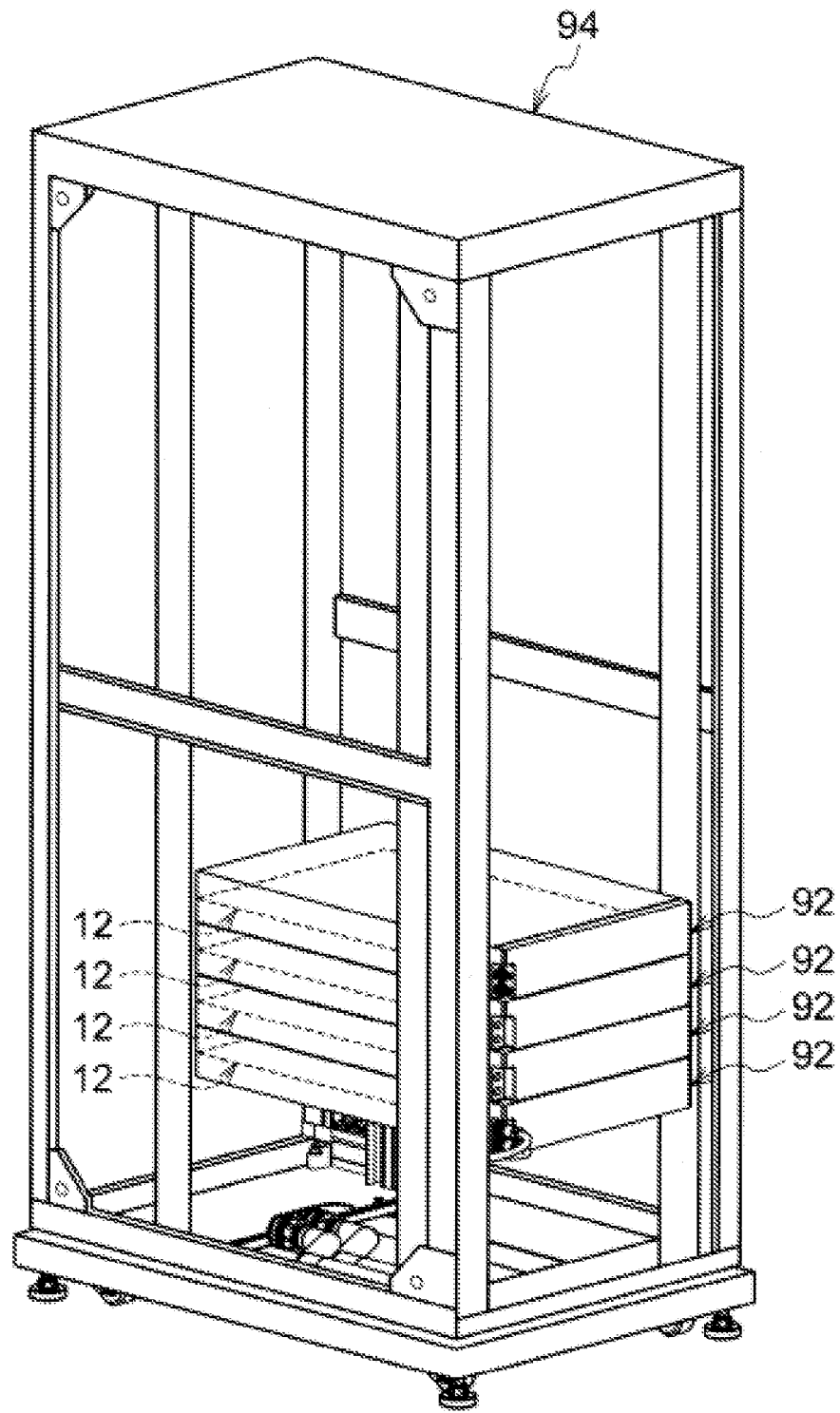
FIG. 3 is a perspective view illustrating an information processor.

As illustrated in FIG. 3, in the first embodiment, a server 92 has the photoelectric hybrid board 12. The server 92 is an example of an information processor. A plurality of servers 92 in a vertically stacked state are mounted in a rack 94 or the like.

Next, a method for manufacturing the photoelectric hybrid board 12 and action are described.

Figure 4:
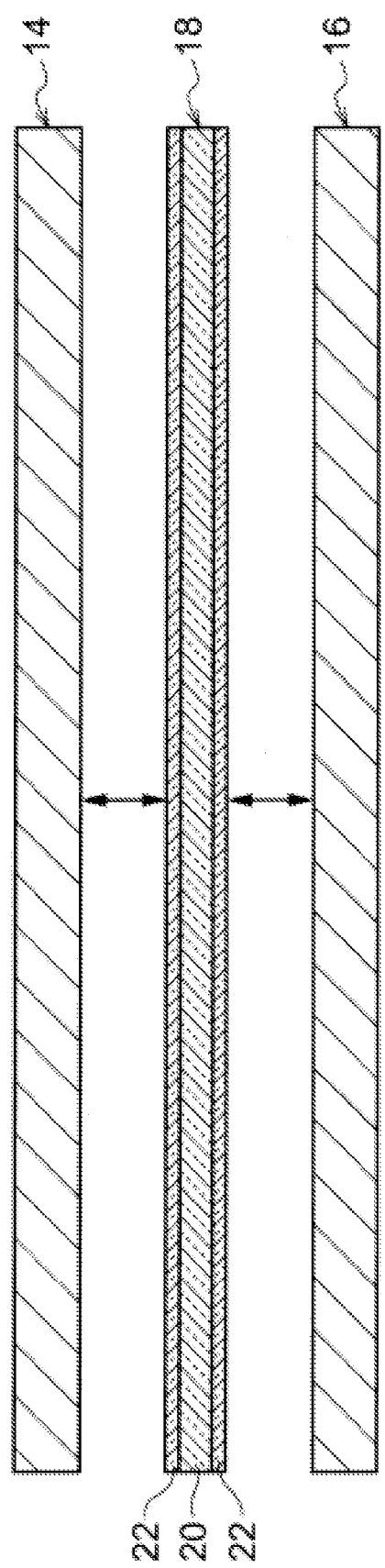
FIG. 4 is a cross-sectional view illustrating a method for manufacturing the photoelectric hybrid board of the first embodiment.

In order to manufacture the photoelectric hybrid board 12, as illustrated in FIG. 4, the optical waveguide layer 18 provided with the core 20 and the clads 22, the first printed circuit board 14, and the second printed circuit board 16 are stacked.

Note that as described below, the structure may be such that there is no second printed circuit board 16. In this embodiment, however, the structure has the second printed circuit board 16. Therefore, the first printed circuit board 14 and the second printed circuit board 16 are stacked so as to sandwich the optical waveguide layer 18.

The circuit patterns 40, 52 (not illustrated in FIG. 4. See FIG. 1) have been formed in advance on the first printed circuit board 14 and the second printed circuit board 16.

Figure 5:
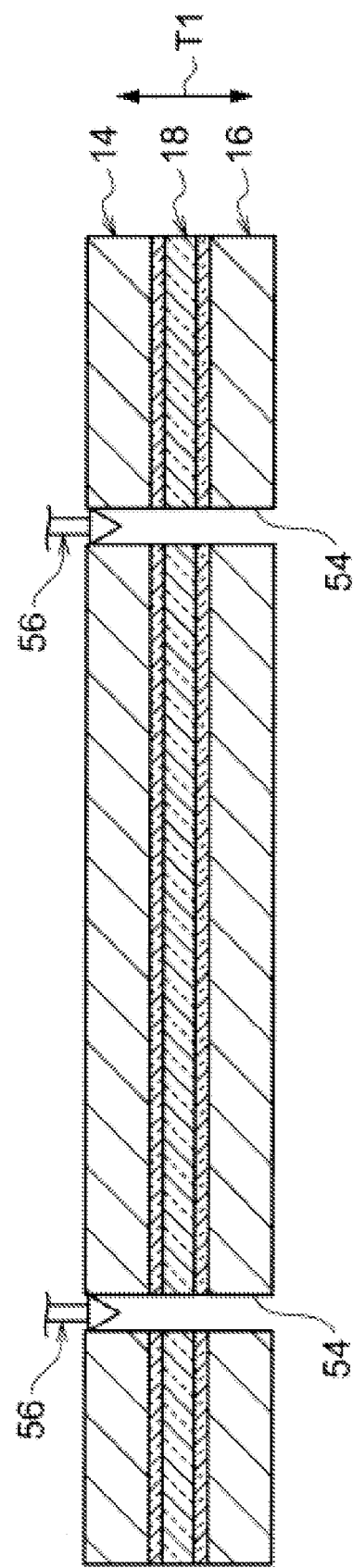
FIG. 5 is a cross-sectional view illustrating the method for manufacturing the photoelectric hybrid board of the first embodiment.

Then, as illustrated in FIG. 5, a through-hole 54 is formed, penetrating the first printed circuit board 14, the optical waveguide layer 18, and the second printed circuit board 16 in the thickness direction (direction of the arrow T1). The through-hole 54 may be formed by a drill 56, for example.

Note that while the through-hole 54 is formed from the first printed circuit board 14 side in FIG. 5, the through-hole 54 may also be formed from the second printed circuit board 16 side.

Figure 6:
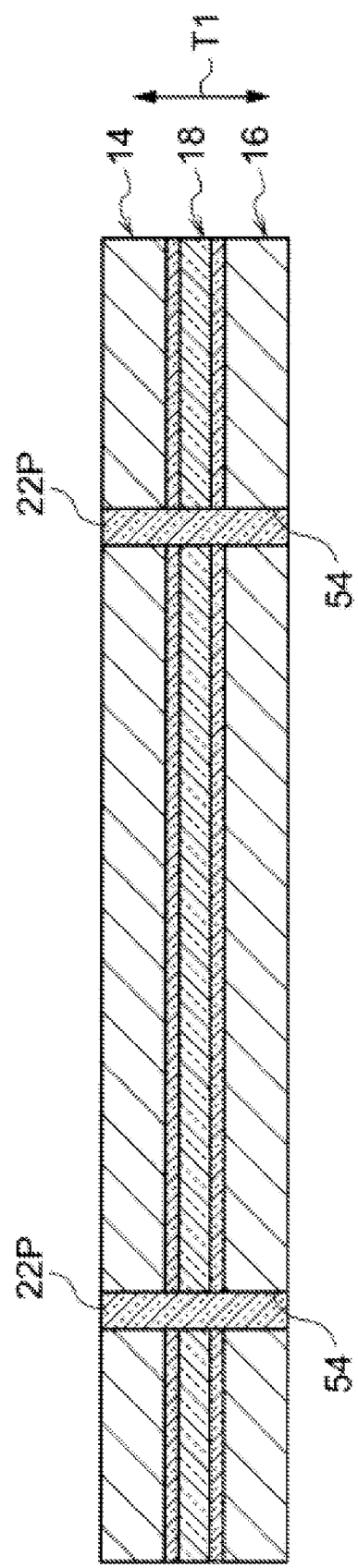
FIG. 6 is a cross-sectional view illustrating the method for manufacturing the photoelectric hybrid board of the first embodiment.

Then, as illustrated in FIG. 6, the through-hole 54 is filled with a clad material 22P. The clad material 22P is an example of an optical waveguide structural material and a member for the clads 22 of the optical waveguide section 24 (see FIG. 1). However, in this stage, no core 20 is present inside the through-hole 54, which is filled with the clad material 22P.

Figure 7:
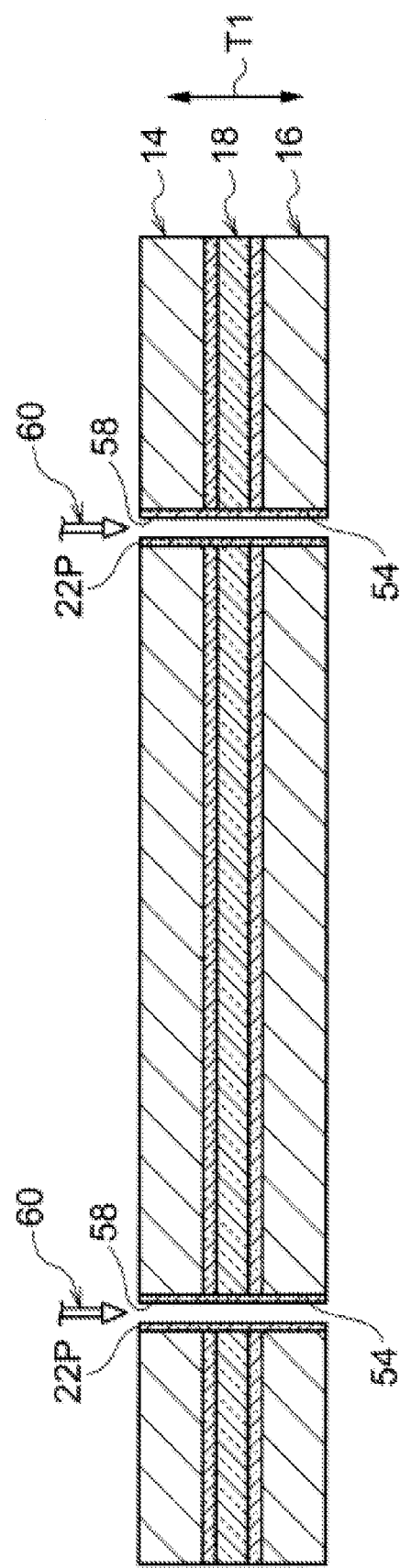
FIG. 7 is a cross-sectional view illustrating the method for manufacturing the photoelectric hybrid board of the first embodiment.

Then, as illustrated in FIG. 7, a through-hole 58 in the thickness direction (direction of the arrow T1) is formed at the center of the clad material 22P. The inside diameter of this through-hole 58 is smaller than the inside diameter of the through-hole 54 (see FIG. 1). The centerline of the through-hole 58 matches the centerline of the through-hole 54. Similar to the through-hole 54, the through-hole 58 may also be formed by a drill 60.

Figure 8:
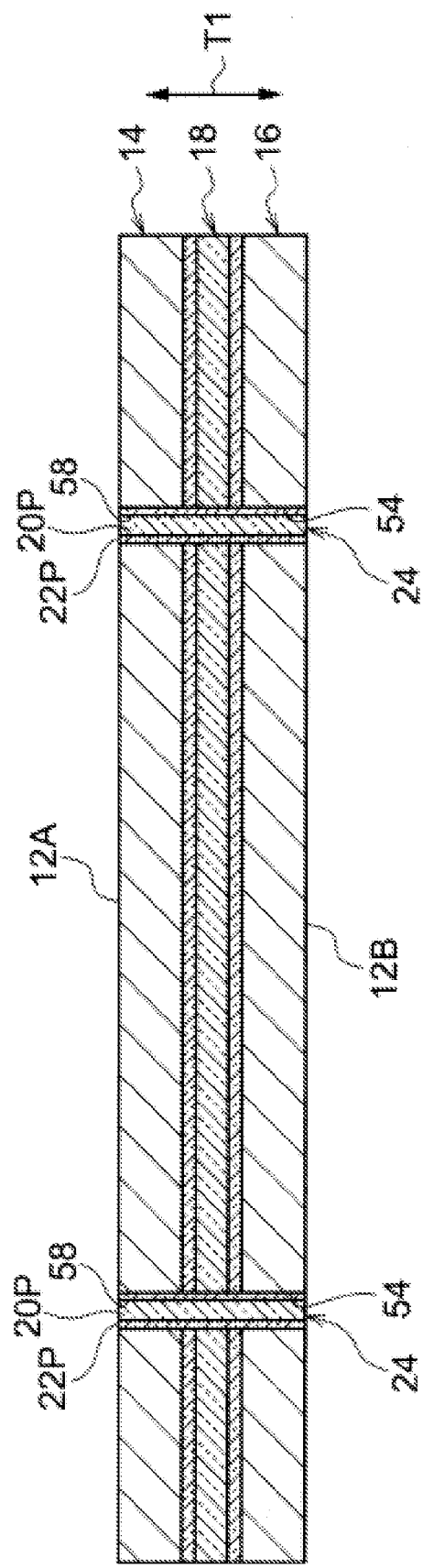
FIG. 8 is a cross-sectional view illustrating the method for manufacturing the photoelectric hybrid board of the first embodiment.

Then, as illustrated in FIG. 8, the through-hole 58 is filled with a core material 20P. The core material 20P is an example of the optical waveguide structural material and a member for the core 20 of the optical waveguide section 24 (see FIG. 1).

With this, the optical waveguide section 24 having the clads 22 located on the outer circumferential sides of the core 20 is formed. In this stage, the optical waveguide section 24 continues from the outer surface of the first printed circuit board 14 (upper surface 12A of the photoelectric hybrid board 12 in FIG. 1) to the outer surface of the second printed circuit board 16 (lower surface 12B of the photoelectric hybrid board 12 in FIG. 1).

Figure 9:
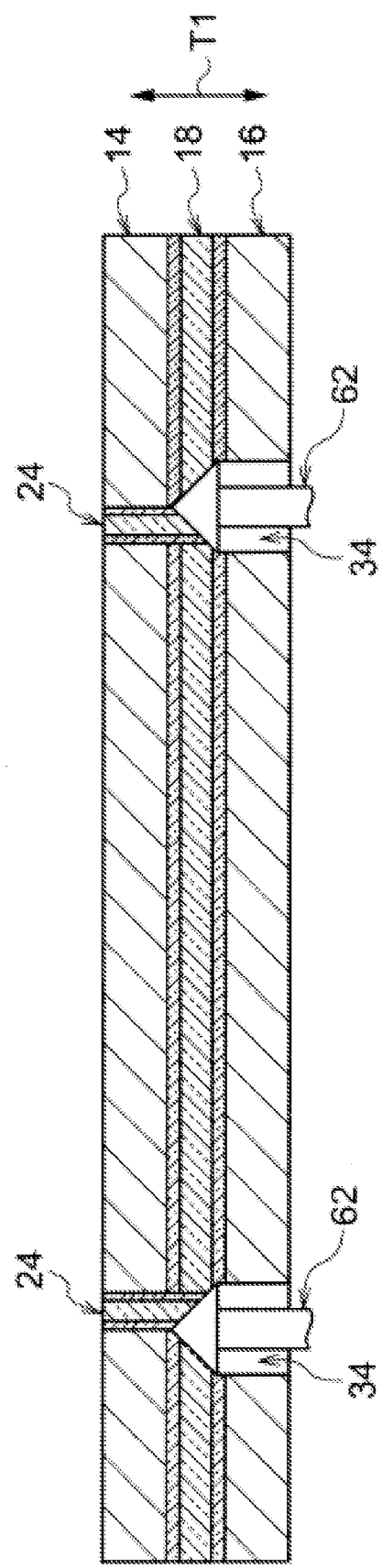
FIG. 9 is a cross-sectional view illustrating the method for manufacturing the photoelectric hybrid board of the first embodiment.

Then, as illustrated in FIG. 9, the concave part 34 is formed from the second printed circuit board 16 side. The concave part 34 may be formed as a drilled hole by using a drill 62, for example.

On the front-end side (upper side in FIG. 9), the concave part 34 has the conical surface 36 conically extending from the centerline 34C of the concave part 34. Furthermore, the concave part 34 has the cylindrical surface 38 cylindrically extending from the outermost circumferential part of the conical surface 36. Depth of the concave part 34 (entry length of the drill 62) is adjusted so that the conical surface 36 is located in the intersection part 26 of the optical waveguide layer 18 and the optical waveguide section 24. With this, the conical surface 36 is the reflection surface 28 that is located in the intersection part 26 (see FIG. 2) and reflects light between the optical waveguide layer 18 and the optical waveguide section 24.

The diameter of the concave part 34 is larger than the diameter of the optical waveguide section 24. In addition, the centerline 34C of the concave part 34 is displaced from the centerline 24C of the optical waveguide section 24 that is the centerline of the optical waveguide section 24. Then, on the cross section depicted in FIG. 1 and FIG. 2, the entire conical surface 36 is located in the intersection part 26 on one side of the centerline 24C of the optical waveguide section 24. More specifically, since the conical surface 36 does not spread out of the optical waveguide section 24 on the one side of the centerline 24C of the optical waveguide section 24, the reflection surface 28 may be formed by effectively using the conical surface 36.

In addition, the diameter of the concave part 34 is equal to or more than twice the diameter of the optical waveguide section 24. Then, the centerline 34C of the concave part 34 is located on the sidewall of the optical waveguide section 24. Therefore, the reflection surface 28 is located across the whole area of the optical waveguide section 24 in the width direction.

Then, the clad material 22P and the core material 20P in the through-hole 54 being partially scraped away from the second print circuit board 16 side, a part remaining without being scraped is the optical waveguide section 24.

Figure 10:
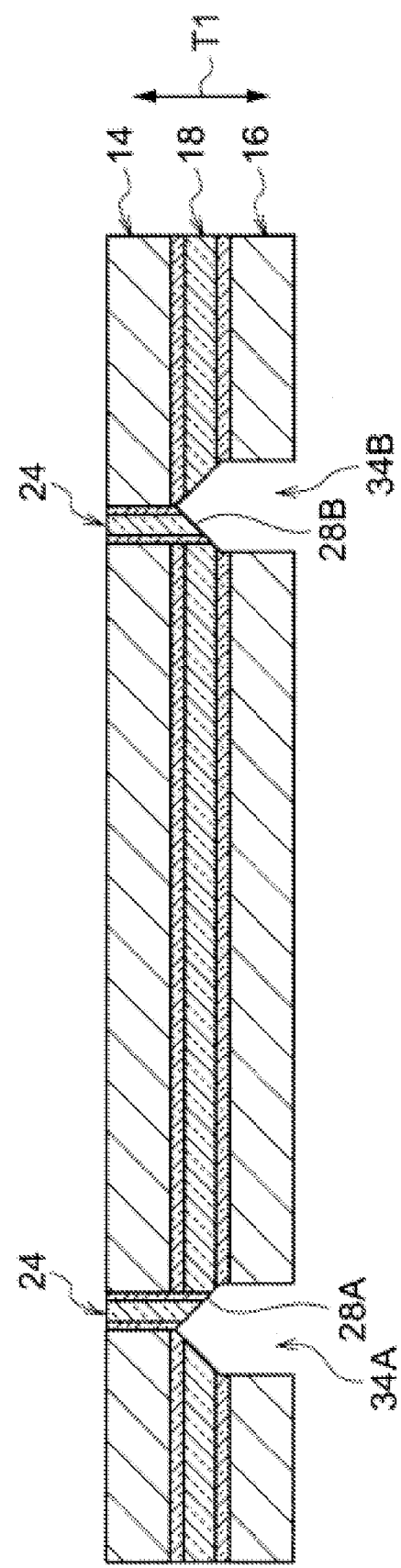
FIG. 10 is a cross-sectional view illustrating the method for manufacturing the photoelectric hybrid board of the first embodiment.

As illustrated in FIG. 10, even in the condition in which the concave part 34 is formed (with the light emitting member 44 or the light receiving member 46 not mounted), the board may be called a photoelectric hybrid board. More specifically, even if the light emitting member 44 or the light receiving member 46 is not mounted, the circuit mixedly has a part where an electric signal runs (circuit pattern 40) and a part where an optical signal runs (optical waveguide layer 18, the optical waveguide section 24). In contrast to this, this embodiment is a photoelectric hybrid board structured to further mount the light emitting member 44 and the light receiving member 46 on the first printed circuit board 14.

Then, at a position where light emitted by the light emitting section 48 reaches the optical waveguide section 24B, the light emitting member 44 is electrically connected to the circuit pattern 40 on the first printed circuit board 14 by solder 32. In addition, at a position where light exiting from the optical waveguide section 24B is received by the light receiving section 50, the light receiving member 46 is electrically connected to the circuit pattern 40 on the first printed circuit board 14 by the solder 32. With the above, the photoelectric hybrid board 12 of the embodiment is manufactured.

As may be seen from the above description, the optical waveguide section 24 is formed on the first printed circuit board 14, with the optical waveguide layer 18, the first printed circuit board 14, and the second printed circuit board 16 stacked. Then, the concave part 34 being formed from the second printed circuit board 16 side, the reflection surface 28 is formed in the intersection part 26 of the optical waveguide layer 18 and the optical waveguide section 24.

Here, as a comparative example, a case is considered in which after the reflection surface 28 is formed on the optical waveguide layer 18 and the optical waveguide section 24 is formed on the first printed circuit board 14, the optical waveguide layer 18 and the first printed circuit board 14 are stacked. In the comparative example, it is difficult to accurately align the optical waveguide section 24 with the reflection surface 28. In addition, for example, it is also difficult to form the optical waveguide section 24 on the first printed circuit board 14 at a position corresponding to the reflection surface 28, after forming the reflection surface 28 on the optical waveguide layer 18.

In contrast to this, in this embodiment, the concave part 34 being formed after the first printed circuit board 14 and the optical waveguide layer 18 through which the optical waveguide section 24 is formed are stacked, the reflection surface 28 is formed in the intersection part 26 of the optical waveguide layer 18 and the optical waveguide section 24. Compared with work of aligning the optical waveguide section 24 with the reflection surface 28 as with the comparative example, work of forming the concave part 34 keeps higher position precision more easily. Therefore, in this embodiment, more accurate alignment of the optical waveguide section 24 with the reflection surface 28 is possible.

In this embodiment, in particular, the centerline 34C of the concave part 34 is laterally displaced from the centerline 24C of the optical waveguide section 24. Therefore, compared with the structure in which the centerline 34C of the concave part 34 matches the centerline 24C of the optical waveguide section 24, the reflection surface 28 is formed in a wider range in the width direction (lateral direction) of the optical waveguide section 24.

Yet, in this embodiment, the inside diameter D1 of the concave part 34 is larger than the width W1 of the optical waveguide section 24. Therefore, compared with a structure in which the inside diameter D1 of the concave part 34 is equal to or less than the width W1 of the optical waveguide section 24, the reflection surface 28 may be formed in the wider range in the width direction of the optical waveguide section 24, on the cross section depicted in FIG. 1 and FIG. 2.

In the first embodiment, the light emitting member 44 is mounted on the photoelectric hybrid board 12. Since the light emitting member 44 is integrated with the photoelectric hybrid board 12, a positional relation of the light emitting member 44 and the optical waveguide section 24A may be kept fixed.

Then, with the light emitting member 44 integrated with the photoelectric hybrid board 12, an electric signal running through the circuit pattern 40 may be converted into an optical signal in a compact structure.

Similarly, in the first embodiment, the light receiving member 46 is mounted on the photoelectric hybrid board 12. Since the light receiving member 46 is integrated with the photoelectric hybrid board 12, a positional relation of the light receiving member 46 and the optical waveguide section 24B may be kept fixed.

Then, with the light receiving member 46 integrated with the photoelectric hybrid board 12, the optical signal exiting from the optical waveguide section 24B may be converted into an electric signal in a compact structure.

Yet, in the first embodiment, a structure is such that light exiting from the light emitting section 48 of the light emitting member 44 passes through the optical waveguide section 24A, the optical waveguide layer 18, and the optical waveguide section 24B, and is received by the light receiving section 50 of the light receiving member 46. More specifically, it is possible in one photoelectric hybrid board 12 that an electric signal is converted into an optical signal and then propagated, and further the propagated optical signal is converted back to an electric signal.

Then, in the first embodiment, since the reflection surface 28A is formed on the optical waveguide section 24A with high position precision, light may be reliably reflected from the optical waveguide section 24A to the optical waveguide layer 18. In addition, since the reflection surface 28B is formed on the optical waveguide section 24B with high position precision, light may be reliably reflected from the optical waveguide layer 18 to the optical waveguide section 24B.

Next, a second embodiment is described. In the second embodiment, identical elements, members, or the like to the first embodiment are assigned identical reference numerals and signs in the drawings, and a detailed description may be omitted.

Figure 11:
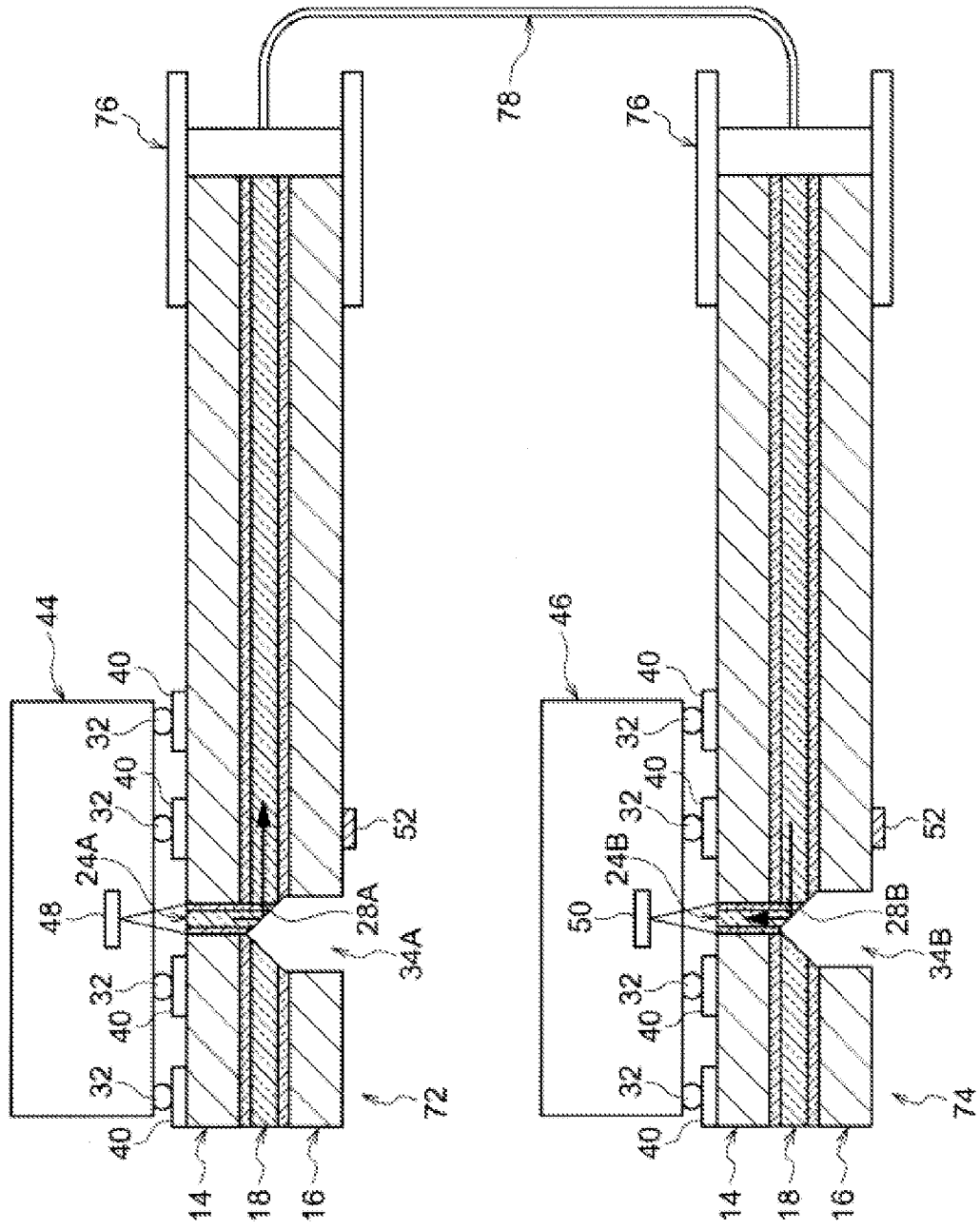
FIG. 11 is a cross-sectional view illustrating a photoelectric hybrid board of a second embodiment.

As illustrated in FIG. 11, in the second embodiment, a photoelectric hybrid board 72 and a photoelectric hybrid board 74 are used as a pair.

An optical connector 76 is attached to an end in the width direction of the photoelectric hybrid board 72 and to an end of the photoelectric hybrid board 74. The optical connector 76 is connected by an optical cable 78. Light exiting from a light emitting section 48 of a light emitting member 44 of the photoelectric hybrid board 72 is transmitted from an optical waveguide section 24A to an optical waveguide layer 18, and then enters the optical cable 78. This light is further transmitted from the optical waveguide layer 18 of the photoelectric hybrid board 74 to an optical waveguide section 24B and enters a light receiving section 50 of a light receiving member 46.

Therefore, the light receiving member 46 may not be mounted in the photoelectric hybrid board 72 of the second embodiment. Similarly, in the second embodiment, the light emitting member 44 may not be mounted in the photoelectric hybrid board 74.

The photoelectric hybrid boards 12, 72, 74 described above have the second printed circuit board 16. Even with a structure in which there is no second printed circuit board 16 and the optical waveguide layer 18 is exposed on an opposite side of the first printed circuit board 14, the reflection surface 28 may be formed by forming a concave part 34 on the optical waveguide layer 18 from the opposite side of the first printed circuit board 14.

As described above, in the photoelectric hybrid boards 12, 72, 74 structured to have the second printed circuit board 16, the optical waveguide layer 18 is located on an inner layer of the photoelectric hybrid board, and one surface each of the first printed circuit board 14 and the second printed circuit board 16 is exposed to the outside (upper surface 12A, lower surface 12B). Thus, an electronic component may be mounted on the outer surface of the first printed circuit board 14 and the outer surface of the second printed circuit board 16, which may contribute to high-density packaging.

Since the photoelectric hybrid boards 12, 72, 74 described above have the optical waveguide section 24, the photoelectric hybrid boards 12, 72, 74 may control attenuation of light exiting from the light emitting section 48 and transmit the light to the optical waveguide layer 18, compared with the structure without the optical waveguide section 24. In addition, since the photoelectric hybrid boards 12, 72, 74 have the optical waveguide section 24B, the photoelectric hybrid boards 12, 72, 74 may control attenuation of light propagating in the optical waveguide layer 18 and cause the light receiving section 50 to receive light, compared with the structure without the optical waveguide section 24B.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A photoelectric hybrid board comprising:
   a first board on which a circuit is formed;
   an optical waveguide layer stacked with the first board;
   a first optical waveguide section formed in a direction of stacking in the first board and the optical waveguide layer; and
   a concave part formed, from the optical waveguide layer side, in the optical waveguide layer in an intersection part of the optical waveguide layer and the first optical waveguide section,
   wherein the concave part has a conical surface that extends conically, and
   wherein the conical surface has a reflection surface inclined to the optical waveguide layer at an angle of 45 degrees, and the reflection surface reflects light entering the first optical waveguide section to the optical waveguide layer.

2. The photoelectric hybrid board according to claim 1, further comprising:
   a second board arranged on an opposite side to the first board on the optical waveguide layer; and
   the second board has a cylindrical opening connecting to the concave part.

3. The photoelectric hybrid board according to claim 2, wherein a centerline of the opening is displaced from a centerline of the first optical waveguide section.

4. The photoelectric hybrid board according to claim 2, wherein an inside diameter of the opening is larger than a width of the first optical waveguide section.

5. The photoelectric hybrid board according to claim 1, further comprising:
   a light emitting section mounted on the first board and configured to emit light to the first optical waveguide section.

6. The photoelectric hybrid board according to claim 5, wherein the light emitting section converts an electric signal from the circuit into an optical signal.

7. The photoelectric hybrid board according to claim 1, further comprising:
   a second optical waveguide section formed in the first board and the optical waveguide layer in the direction of stacking; and
   a light receiving section mounted on the first board and configured to receive light exiting from the second optical waveguide section.

8. The photoelectric hybrid board according to claim 7,
wherein the light receiving section converts an optical signal received by the light receiving section into an electric signal.

9. An information processor, comprising
a photoelectric hybrid board including
a first board on which a circuit is formed;
an optical waveguide layer stacked with the first board;
a first optical waveguide section formed in a direction of stacking in the first board and the optical waveguide layer; and
a concave part formed, from the side of optical waveguide layer, in the optical waveguide layer in an intersection part of the optical waveguide layer and the first optical waveguide section,
wherein the concave part has a conical surface that extends conically, and
wherein the conical surface has a reflection surface inclined to the optical waveguide layer at an angle of 45 degrees, and the reflection surface reflects light entering the first optical waveguide section to the optical waveguide layer.

10. A method for manufacturing a photoelectric hybrid board, comprising:
stacking a first board and an optical waveguide layer;
forming a through-hole in the first board and the optical waveguide layer in a direction of stacking;
filling the through-hole with an optical waveguide structural material to form an optical waveguide section; and
forming a concave part having an inclined surface in an intersection part of the optical waveguide layer with the optical waveguide section,
wherein the concave part has a conical surface that extends conically, and
wherein the conical surface has a reflection surface inclined to the optical waveguide layer at an angle of 45 degrees, and the reflection surface reflects light entering the first optical waveguide section to the optical waveguide layer.

11. The method for manufacturing the photoelectric hybrid board, according to claim 10,
wherein the forming of a concave part forms a concave part such that a centerline of the concave part is displaced from a centerline of the optical waveguide section.

* * * * *